UNITED STATES PATENT OFFICE.

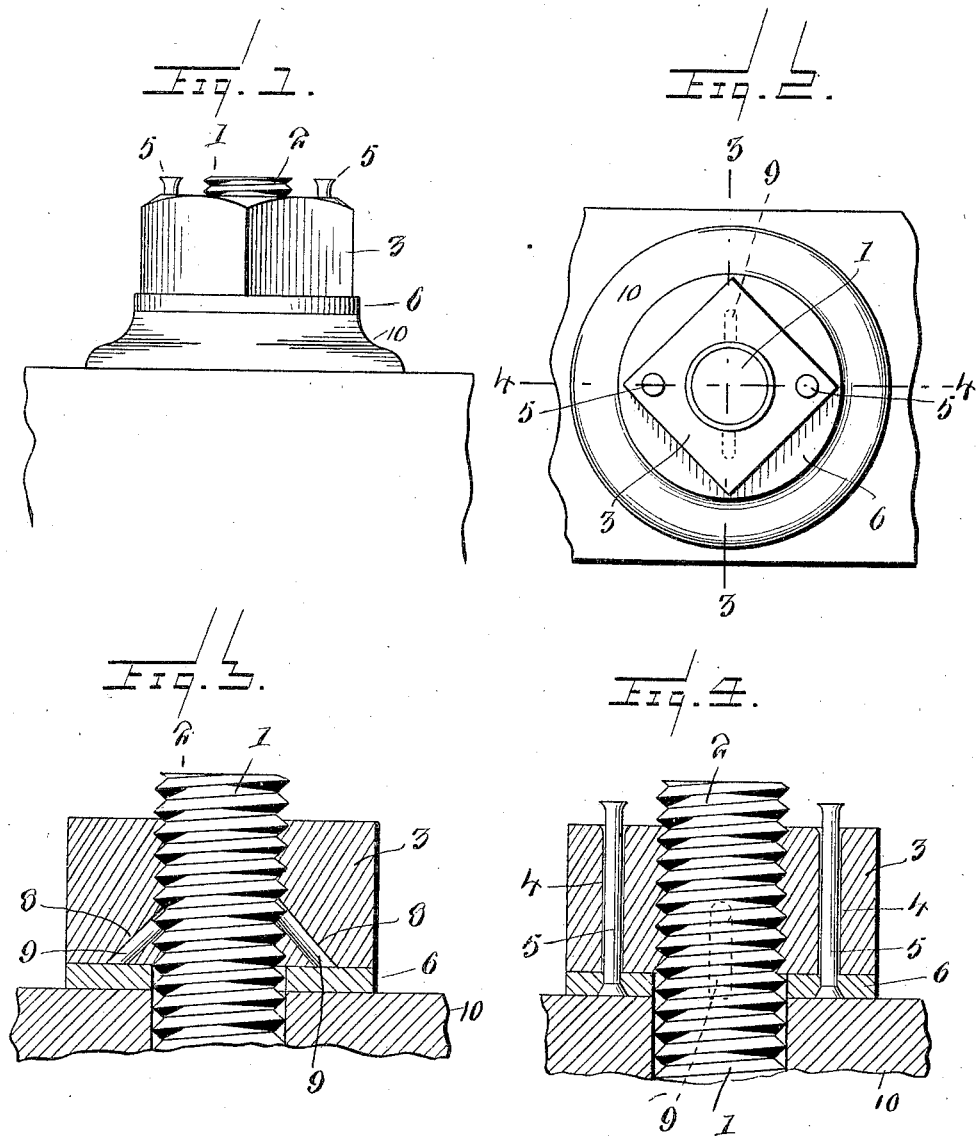

DAVID S. MARPLE, OF OSBORNE, KANSAS.

NUT-LOCK.

1,051,246. Specification of Letters Patent. Patented Jan. 21, 1913.

Application filed March 9, 1912. Serial No. 682,579.

*To all whom it may concern:*

Be it known that I, DAVID S. MARPLE, a citizen of the United States, residing at Osborne, in the county of Osborne and State of Kansas, have invented new and useful Improvements in Nut-Locks, of which the following is a specification.

This invention relates to nut locks and the object of the invention is to provide a simple and efficient device of this character whereby the nut may be effectually locked to the bolt so as to prevent accidental unscrewing therefrom.

Further objects of this invention will appear as the following specific description is read in connection with the accompanying drawing, which forms a part of this application, and in which:—

Figure 1 is a side elevation. Fig. 2 is a top plan view. Fig. 3 is a section on the line 3—3 of Fig. 2. Fig. 4 is a similar section on the line 4—4 of Fig. 2. Fig. 5 is a detail side elevation of the pin.

Referring more particularly to the drawing, 1 represents a bolt which is threaded at one end, as shown at 2, and adjustably mounted thereon is a nut 3 which is provided with a plurality of longitudinally disposed passages 4 arranged at diametrically opposite corners to receive the connecting pins 5 which are slidably mounted in the apertures and which are headed up to prevent disengagement from the nut. The opposite end of the pins 5 are passed through the washer 6 and suitably headed up to prevent disengagement therefrom.

Slidably mounted in diagonal grooves 8 disposed radially and at an incline to the axis of the bolt are locking pins 9 which are forced into engagement with the threads of the bolt when the nut is clamped upon the washer 6. The washer rotates with the nut but is capable of moving toward and away from the same, as will be readily understood. When the washer is jammed upon the nut by reason of the same being clamped between the nut and the support, 10, the pins 9 will be forced into engagement with certain of the threads of the bolt and the nut held against rotation.

What is claimed is:—

1. In combination, a threaded bolt, a nut threaded thereon, diagonally extending pins loosely mounted in the nut, and a washer connected to rotate with the bolt, said washer adapted to force the pins into engagement with the threads of the bolt, when the nut is screwed down upon the same.

2. In combination, a threaded bolt, a nut threaded thereon, diagonally extending pins loosely mounted in the nut, a washer surrounding the bolt, and pins carried by the washer and slidably mounted in the nut for holding said washer against rotation independent of the nut, said washer adapted to force the locking pins into engagement with the threads of the bolt when the nut is screwed up thereon.

In testimony whereof I affix my signature in presence of two witnesses.

DAVID S. MARPLE.

Witnesses:
S. P. CRAMPTON,
W. E. CRAMPTON.